(12) United States Patent
Menayan et al.

(10) Patent No.: US 10,736,300 B2
(45) Date of Patent: Aug. 11, 2020

(54) DOG MATTRESS

(71) Applicant: Casper Sleep Inc., New York, NY (US)

(72) Inventors: Jesse Menayan, Sausalito, CA (US); Carly Price, Lafayette, CA (US); Jeffrey Chapin, San Francisco, CA (US); Jonathan Belfort, Cape Elizabeth, ME (US); Gen Suzuki, Kamakura (JP); Brittany Kleinman, Brooklyn, NY (US)

(73) Assignee: Casper Sleep Inc., New York, NY (US)

( * ) Notice: Subject to any disclaimer, the term of this patent is extended or adjusted under 35 U.S.C. 154(b) by 516 days.

(21) Appl. No.: 15/677,387

(22) Filed: Aug. 15, 2017

(65) Prior Publication Data
US 2018/0049399 A1 Feb. 22, 2018

Related U.S. Application Data

(60) Provisional application No. 62/375,466, filed on Aug. 16, 2016.

(51) Int. Cl.
*A01K 1/015* (2006.01)
*A01K 1/035* (2006.01)

(52) U.S. Cl.
CPC ............ *A01K 1/015* (2013.01); *A01K 1/0353* (2013.01)

(58) Field of Classification Search
CPC ...... A01K 1/015; A01K 1/035; A01K 1/0353; A01K 29/00; A47C 27/148; A47C 27/15
(Continued)

(56) References Cited

U.S. PATENT DOCUMENTS

| 1,893,548 A | 1/1933 | Hardy |
| 2,032,248 A * | 2/1936 | Bins ..................... A01K 1/0353 |
| | | 119/482 |

(Continued)

FOREIGN PATENT DOCUMENTS

| CN | 102822224 | 12/2012 |
| CN | 203328338 | 12/2013 |

(Continued)

OTHER PUBLICATIONS

AmazonBasics Padded Pet Bolster Bed (https://www.amazon.com/AmazonBasics-Padded-Pet-Bolster-Bed/dp/B00QHC06UO?ie=UTF8&keywords=dog%20bed&qid=1459134598&ref_=sr_1_11&refinements=p_n_feature_keywords_two_browse-bin%3A8002501011%7C8002502011%7C8002503011&s=pet-supplies&sr=1-11), accessed Sep. 16, 2016.

(Continued)

*Primary Examiner* — Tien Q Dinh
*Assistant Examiner* — Brady W Frazier
(74) *Attorney, Agent, or Firm* — Koffsky Schwalb LLC; Mark I. Koffsky

(57) ABSTRACT

A foam-based dog bed with no loose fiber comprising 5 components: 4 identical bolsters and 1 internal mattress is described. Both the internal mattress and bolsters may be comprised of 2-layers of different foam qualities. The foam pieces are wrapped in foam sheaths to make stuffing and un-stuffing into the outer fabric cover easier. The outer fabric cover is comprised of a top fabric, border fabric and bottom fabric. The top fabric incorporates specifically tailored wrinkles to allow a dog to dig, scratch, and prepare their bed. On the bottom panel of the dog bed is an outer perimeter zipper. The outer zipper starts and stops at a zipper pocket, which also serves as a hinge to open/close the bottom panel.

(Continued)

The zipper pocket holds the zipper pull to prevent a dog from biting at it.

18 Claims, 13 Drawing Sheets

(58) Field of Classification Search
USPC .................. 119/28.5; 5/902; 297/218.2
See application file for complete search history.

(56) References Cited

U.S. PATENT DOCUMENTS

| | | |
|---|---|---|
| D107,880 S | 1/1938 | Marsack |
| 2,399,235 A | 4/1946 | Leslie |
| 2,399,625 A | 4/1946 | Leslie |
| 3,400,413 A | 9/1968 | La Grossa |
| D256,734 S | 9/1980 | Riley |
| 4,542,547 A | 9/1985 | Sato |
| D301,412 S | 6/1989 | Duvivier |
| 4,964,184 A | 10/1990 | Lewis |
| 5,010,843 A * | 4/1991 | Henry .............. A01K 1/0353 119/28.5 |
| 5,023,967 A | 6/1991 | Ferrand |
| 5,023,970 A | 6/1991 | Tesch |
| 5,219,307 A | 6/1993 | Morrison |
| 5,291,625 A | 3/1994 | Leslie |
| 5,294,181 A | 3/1994 | Rose |
| 5,561,876 A | 10/1996 | Petruzella |
| D383,028 S | 9/1997 | Pierce |
| D411,057 S | 6/1999 | Johnson |
| 6,175,890 B1 | 1/2001 | Yamaura |
| 6,175,980 B1 | 1/2001 | Gaither |
| 6,196,157 B1 * | 3/2001 | Northrop .......... A01K 1/0353 119/28.5 |
| 6,212,718 B1 | 4/2001 | Stolpmann |
| 6,301,730 B1 | 10/2001 | Delfs |
| 6,305,317 B1 | 10/2001 | Spiegel |
| D486,665 S | 2/2004 | Weaver |
| D486,877 S | 2/2004 | Peterson |
| D486,969 S | 2/2004 | Weaver |
| D487,207 S | 3/2004 | Manuel |
| 6,971,128 B1 | 12/2005 | McGrath |
| 6,983,500 B2 | 1/2006 | Wootten |
| D551,704 S | 9/2007 | Nakamura |
| D581,713 S | 12/2008 | Berke |
| 7,530,127 B2 | 5/2009 | Leifermann |
| 7,614,362 B2 | 11/2009 | Dunn |
| D608,560 S | 1/2010 | Chen |
| D608,561 S | 1/2010 | Chen |
| D608,562 S | 1/2010 | Chen |
| 7,788,750 B2 | 9/2010 | Norstrem |
| D634,148 S | 3/2011 | Morrison |
| 8,051,514 B2 | 11/2011 | Yarmer |
| D657,150 S | 4/2012 | Hughes |
| D658,412 S | 5/2012 | Hoyord |
| D663,077 S | 7/2012 | Pohl |
| D664,303 S | 7/2012 | Chauncey |
| 8,245,339 B2 | 8/2012 | Murray |
| D674,644 S | 1/2013 | Stewart |
| D675,855 S | 2/2013 | Reeves |
| D679,870 S | 4/2013 | Williams |
| D696,044 S | 12/2013 | Robilotto |
| D699,983 S | 2/2014 | Polesuk |
| D702,971 S | 4/2014 | Mitchell |
| D702,972 S | 4/2014 | Busch |
| D713,165 S * | 9/2014 | Robinson ............... D6/391 |
| D720,157 S | 12/2014 | Villena |
| D722,239 S | 2/2015 | Russell |
| 8,959,683 B2 | 2/2015 | Rochlin |
| D723,304 S | 3/2015 | Chang |
| D725,832 S * | 3/2015 | Coulter ................. D30/118 |
| D728,271 S | 5/2015 | Cohen |
| D731,209 S | 6/2015 | Fux |
| 9,085,125 B2 | 7/2015 | Gesquière |
| D736,537 S | 8/2015 | Grossman |
| D747,899 S | 1/2016 | Klein |
| D773,209 S * | 12/2016 | Jaigobin ................ D6/596 |
| 9,510,698 B1 | 12/2016 | Krotova |
| D776,960 S | 1/2017 | Suzuki |
| D778,637 S | 2/2017 | Barry |
| D779,856 S | 2/2017 | Rich |
| D781,078 S | 3/2017 | Goenka |
| D785,370 S | 5/2017 | Randall |
| D785,968 S | 5/2017 | Burden |
| D790,257 S | 6/2017 | Holbrook |
| D791,494 S | 7/2017 | Bosch |
| 9,737,150 B2 | 8/2017 | Rawls-Meehan |
| D798,077 S | 9/2017 | Schmitt |
| 9,788,661 B1 | 10/2017 | Alletto |
| D802,324 S | 11/2017 | Bucove |
| D809,321 S | 2/2018 | Bell |
| D810,458 S | 2/2018 | Cartier |
| D822,911 S * | 7/2018 | Menayan ............... D30/118 |
| D824,698 S | 8/2018 | Pennington |
| D836,849 S * | 12/2018 | Romaya ................ D30/118 |
| 2001/0029628 A1 | 10/2001 | Ferrand |
| 2003/0181538 A1 | 9/2003 | Martel |
| 2003/0233706 A1 | 12/2003 | Birch |
| 2004/0134433 A1 * | 7/2004 | Holder ............. A01K 1/0353 119/28.5 |
| 2004/0154101 A1 | 8/2004 | Digirolamo |
| 2005/0087142 A1 * | 4/2005 | Dalal ............... A01K 1/0353 119/28.5 |
| 2005/0210595 A1 | 9/2005 | Di Stasio |
| 2005/0224000 A1 * | 10/2005 | Holte ............... A01K 1/0353 119/28.5 |
| 2006/0046024 A1 | 3/2006 | Huntley |
| 2006/0085919 A1 | 4/2006 | Kramer |
| 2006/0254526 A1 * | 11/2006 | Andriola ........... A01K 1/0353 119/28.5 |
| 2006/0272582 A1 * | 12/2006 | Dunn ............... A01K 1/0353 119/28.5 |
| 2007/0040424 A1 | 2/2007 | Neustat |
| 2007/0101496 A1 | 5/2007 | Ho |
| 2007/0226911 A1 | 10/2007 | Gladney |
| 2007/0256241 A1 | 11/2007 | Harmon |
| 2007/0273539 A1 | 11/2007 | Gananathan |
| 2008/0010746 A1 | 1/2008 | Ho |
| 2008/0010751 A1 | 1/2008 | Kemper |
| 2008/0127897 A1 | 6/2008 | Flannery |
| 2008/0127898 A1 * | 6/2008 | Morse ............... A01K 1/0353 119/28.5 |
| 2008/0127899 A1 * | 6/2008 | Angus ............... A01K 1/0353 119/28.5 |
| 2008/0173627 A1 * | 7/2008 | Martin ............... A01K 1/0272 219/201 |
| 2009/0089933 A1 | 4/2009 | Letton |
| 2009/0106894 A1 * | 4/2009 | Yeo ................. A47D 15/001 5/93.1 |
| 2009/0127912 A1 * | 5/2009 | Galbreath ............ B29C 44/14 297/452.18 |
| 2009/0151072 A1 | 6/2009 | Jones, III |
| 2009/0172881 A1 | 7/2009 | Peterson |
| 2010/0050341 A1 | 3/2010 | Tepper |
| 2010/0058541 A1 | 3/2010 | Kemper |
| 2010/0087561 A1 | 4/2010 | Abraham |
| 2010/0160473 A1 | 6/2010 | Neff |
| 2010/0205738 A1 | 8/2010 | Pollack |
| 2010/0269262 A1 | 10/2010 | Warren |
| 2010/0313356 A1 | 12/2010 | Morter |
| 2011/0061168 A1 | 3/2011 | Farley |
| 2011/0067183 A1 | 3/2011 | Hawkins |
| 2011/0115635 A1 | 5/2011 | Petrovski |
| 2011/0154576 A1 | 6/2011 | Warren |
| 2011/0252572 A1 | 10/2011 | Morrison |
| 2011/0290834 A1 | 12/2011 | Pelz |
| 2011/0314605 A1 | 12/2011 | Deguchi |
| 2012/0001548 A1 | 1/2012 | Recker |
| 2012/0060284 A1 | 3/2012 | Caines |
| 2012/0324646 A1 | 12/2012 | Briganti |
| 2013/0042411 A1 | 2/2013 | Vitale |
| 2013/0180050 A1 | 7/2013 | Koci |
| 2013/0247828 A1 | 9/2013 | Tedaldi |

(56) References Cited

U.S. PATENT DOCUMENTS

| | | | |
|---|---|---|---|
| 2013/0263377 A1 | 10/2013 | Wootten, Jr. | |
| 2013/0263386 A1 | 10/2013 | Romero | |
| 2013/0284099 A1* | 10/2013 | Oakes, Jr. | A01K 1/0353 119/28.5 |
| 2014/0039082 A1 | 2/2014 | Peterson | |
| 2014/0059765 A1 | 3/2014 | Harris | |
| 2014/0082846 A1 | 3/2014 | Blazar | |
| 2014/0099468 A1 | 4/2014 | Cai | |
| 2014/0130255 A1 | 5/2014 | Montano, Jr. | |
| 2014/0189955 A1 | 7/2014 | Alletto, Jr. | |
| 2014/0190417 A1* | 7/2014 | Lipscomb | A01K 1/0353 119/28.5 |
| 2014/0208517 A1 | 7/2014 | Gross | |
| 2014/0227552 A1 | 8/2014 | Lau | |
| 2014/0230735 A1* | 8/2014 | Coulter | A01K 1/0353 119/28.5 |
| 2014/0250596 A1 | 9/2014 | De La Place | |
| 2014/0283303 A1 | 9/2014 | Rochlin | |
| 2015/0000042 A1 | 1/2015 | Randall | |
| 2015/0067967 A1 | 3/2015 | Tyree | |
| 2015/0074911 A1 | 3/2015 | Dungan | |
| 2015/0135435 A1 | 5/2015 | Ueda | |
| 2015/0237824 A1* | 8/2015 | Cantwell | A01K 1/034 119/482 |
| 2015/0296995 A1 | 10/2015 | Krim | |
| 2015/0351982 A1 | 12/2015 | Krenik | |
| 2016/0106061 A1* | 4/2016 | Nelson | A01K 1/0353 119/28.5 |
| 2016/0135623 A1 | 5/2016 | Montzka | |
| 2016/0169490 A1 | 6/2016 | Kijima | |
| 2016/0192617 A1* | 7/2016 | Murphy | A01K 1/0353 119/28.5 |
| 2016/0224750 A1 | 8/2016 | Kethman | |
| 2016/0262557 A1 | 9/2016 | Williams | |
| 2016/0296031 A1* | 10/2016 | Sramek | A47C 27/148 |
| 2016/0309678 A1* | 10/2016 | Garnet | A01K 1/0353 |
| 2016/0360905 A1 | 12/2016 | Feldman | |
| 2017/0112292 A1 | 4/2017 | Sopher | |
| 2017/0172240 A1 | 6/2017 | Massey | |
| 2017/0208955 A1 | 7/2017 | Lee | |
| 2017/0238715 A1 | 8/2017 | Choi | |
| 2017/0251839 A1 | 9/2017 | McLeod | |
| 2017/0318981 A1 | 11/2017 | Duwell | |
| 2018/0042393 A1 | 2/2018 | Alletto | |
| 2019/0099017 A1 | 4/2019 | Goldberg | |
| 2019/0223630 A1 | 7/2019 | Phan | |
| 2019/0343306 A1 | 11/2019 | Muthanandam | |

FOREIGN PATENT DOCUMENTS

| | | |
|---|---|---|
| DE | 10311434 | 9/2004 |
| FR | 2715550 A1 | 8/1995 |
| GB | 1572763 | 8/1980 |
| GB | 2369569 | 6/2002 |
| WO | 2013157534 | 10/2013 |
| WO | 2014105687 | 7/2014 |
| WO | 2019089830 A1 | 5/2019 |

OTHER PUBLICATIONS

PetCo Sweet Dreams Rectangular Bolster Dog Bed (http://www.petco.com/shop/en/petcostore/dog/dog-beds-and-bedding/dog-beds/sweet-dreams-rectangular-bolster-dog-bed), accessed Sep. 16, 2016.
Round Orvis Dog's Nest (http://www.orvis.com/p/round-orvis-dogs-nest/1h01), accessed Sep. 16, 2016.
Frontgate Hugo Nest Pet Bed (http://www.frontgate.com/huggy-nest-pet-bed/pet-products/pet-beds-blankets-throws/bolster-pet-beds/802099), accessed Sep. 16, 2016.
Petsmart K&H Classy Lounger Pet Bed (http://www.petsmart.com/dog/beds/k-h-classy-lounger-pet-bed-zid36-26968/cat-36-catid-100063?var_id =36-26968), accessed Sep. 16, 2016.
Bowsers Super Loft Rectangle Avalon (http://www.bowsers.com/pet-beds/super-loft-rectangle/super-loft-rectangle-avalon.html), accessed Sep. 16, 2016.
Petco K&H Deluxe Ortho Bolster Sleeper Dog Bed (http://www.petco.com/shop/en/petcostore/dog/dog-beds-and-bedding/dog-beds/kandh-deluxe-ortho-bolster-sleeper-dog-bed-in-eggplant-with-paw-prints#), accessed Sep. 16, 2016.
L.L.Bean Premium Denim Dog Bed Set, Rectangular (http://www.llbean.com/llb/shop/44560?feat=507408-GN2&page=premium-denim-dog-bed-set-rectangular), accessed Sep. 16, 2016.
Amazon Stainmaster Comfy Couch Pet Bed (https://www.amazon.com/STAINMASTER-Comfy-Couch-Large-Olive/dp/B00LQZ18XQ?ie=UTF8&keywords=dog%20bed&qid =1459135646&ref_=sr_1_426&refinements=p_n_feature_keywords_two_browse-bin%3A8002501011% 7C8002502011%7C8002503011&s=pet-supplies&sr=1-426), accessed Sep. 16, 2016.
Jax & Bones Donut Bed (https://www.jaxandbones.com/products/bedding/donut/licorice-donut-bed), accessed Sep. 16, 2016.
Petsmart Carolina Pet Orthopedic Comfort Couch (http://www.petsmart.com/dog/beds/carolina-pet-orthopedic-comfort-couch-personalized-pet-bed-zid36-5591/cat-36-catid-100063?var_id=36-5591), accessed Sep. 16, 2016.
Sealy Lux Premium Dog Bed (http://godogbeds.com/product/sample-product-2/), accessed Sep. 16, 2016.
Frontgate Urban Denim Lounger Pet Bed (http://www.frontgate.com/urban-denim-lounger-pet-bed/pet-products/pet-beds-blankets-throws/bolster-pet-beds/451775),accessed Sep. 16, 2016.
Bowsers Donut Bed (http://www.bowsers.com/pet-beds/donut-beds/donut-bed-nickel-weave.html), accessed Sep. 16, 2016.
L.L.Bean Premium Dog Couch (http://www.llbean.com/llb/shop/66388?feat=507408-GN2&page=premium-dog-couch), accessed Sep. 16, 2016.
Jax & Bones Sleeper Bed (https://www.jaxandbones.com/products/bedding/sleeper/tweed-creme-sleeper-bed), accessed Sep. 16, 2016.
Orvis ToughChew® Dog Bed with Polyester Fill (http://www.orvis.com/p/toughchew-rectangle-dog-bed/0h4c), accessed Sep. 16, 2016.
Orvis Wraparound Fleece Dog Bed with Memory Foam (http://www.orvis.com/p/wraparound-fleece-dog-bed/2es4), accessed Sep. 16, 2016.
Orvis Deep Dish Dog Bed with Memory Foam (http://www.orvis.com/p/deep-dish-dog-bed/2c9b), accessed Sep. 16, 2016.
Bowsers Urban Lounger (http://www.bowsers.com/pet-beds/urban-lounger/urban-lounger-everest.html), accessed Sep. 16, 2016.
Docapet Zz Bed (https://www.docapet.com/product/zz-bed/), accessed Sep. 16, 2016.
Jax & Bones Memory Foam Bed (https://www.jaxandbones.com/products/bedding/memory-foam/juniper-memory-foam-pillow), accessed Sep. 16, 2016.
Orvis Tempur-Pedic® Deep Dish Dog Bed (http://www.orvis.com/p/orvis-tempur-pedic-deep-dish-dog-bed/2gr6), accessed Sep. 16, 2016.
World of Angus Dog Bed (http://worldofangus.com/collections/the-dog-bed-collection/products/the-dog-bed), accessed Sep. 16, 2016.
Howlpot My Territory (http://www.howlpot.com/product/detail.html?product_no=30&cate_no=1&display_group=2), accessed Sep. 16, 2016.
Love Thy Beast Flip Stitch Bed (http://www.lovethybeast.com/collections/sleep/products/flip-stitch-bed-grey-black), accessed Sep. 16, 2016.
Shinola Dolostone Dog Bed (http://www.shinola.com/shop/pet-accessories/dolostone-dog-bed.html#color=Ashen%20Gray), accessed Sep. 16, 2016.
Ruffler Urban Sprawl (http://www.ruffwear.com/Urban-Sprawl-Plush-Dog-Bed?sc=2&category=17), accessed Sep. 16, 2016.
Bad Marion Pilvi Cushion http://en.marlonshop.com/product/Pilvi-Cushion/50/?cate_no=1&display_group=2), accessed Sep. 16, 2016.
International Search Report, Written Opinion of ISA and Search History, PCT/US2015/026564, dated Aug. 31, 2015. (19 pages).
Communication from Thomas Petr received in PCT/US2015/026564, dated Feb. 27, 2016. (1 page).
Supplementary Partial European Search Report for EP 15 78 3835 (Nov. 14, 2017) (14 pages).
Dormia Website Existing at Least as Early as Jun. 14, 2008. (2 pages).

(56) References Cited

OTHER PUBLICATIONS

Specification and Build Sheet for Dormia Radiance Mattress dated Jun. 14, 2007. (2 pages).
Correspondence Regarding Distribution of Dormia Radiance Mattress, Authored by Classic Brands, LLC, dated Nov. 1, 2007. (1 pg).
Casper Pillow review. Sleepopolis. Published on Jan. 22, 2016. Website found at: https://www.youtube.com/watch?v=h4AhiXbEO3U. (15 pages).
Third-Party Submission Under 37 CFR 1.290 dated Jun. 14, 2016 in U.S. Appl. No. 14/689,945. (15 pages).
Third-Party Submission Under 37 CFR 1.290 dated Jun. 27, 2016 in U.S. Appl. No. 14/689,945. (11 pages).
Third-Party Submission under 37 CFR 1.290 dated Jun. 10, 2016 in U.S. Appl. No. 14/689,945. (9 pages).
AmazonBasics Padded Pet Bolster Bed, accessed Sep. 16, 2016. (https://www.amazon.com/AmazonBasics-Padded-Pet-Bolster-Bed/dp/B00QHC06UO- ?ie=UTF8&keywords=dog%20bed&qid=1459134598&ref_=sr_1_11&refinements=p_n_fe- ature_keywords_two_browse-bin%3A8002501011%7C8002502011%7C8002503011&s=pet- -supplies&sr=1-11) (6 pages).
PetCo Sweet Dreams Rectangular Bolster Dog Bed , accessed Sep. 16, 2016 (http://www.petco.com/shop/en/petcostore/dog/dog-beds-and-bedding/dog-bed- s/sweet-dreams-rectangular-bolster-dog-bed) (2 pages).
Bowsers Urban Lounger, accessed Sep. 16, 2016 (http://www.bowsers.com/pet-beds/urban-lounger/urban-loungereverest.html- ) (1 page).
Orvis Tempur-Pedic.RTM. Deep Dish Dog Bed, accessed Sep. 16, 2016. (http://www.orvis.com/p/orvis-tempur-pedic-deepdish-dog-bed/2gr6) (2 pages).
Howlpot My Territory, accessed Sep. 16, 2016. (http://www.howlpot.com/product/detail.html?product_no=30&cate_no=1&displ- ay_group=2) (9 pages).
Ruffler Urban Sprawl, accessed Sep. 16, 2016 (http://www.ruffwearcom/Urban-Sprawl-Plush-Dog-Bed?sc=2&category=17) (2 pages).
DOWNLITE Downlite Dream Naturally 300 Thread Count Wool Down Comforter, accessed Jul. 13, 2017 (www.sears.com/downlite-dream-naturally-300-thread-countwool/)-00000000000000002057100000000000000362141P?plpSellerId=Overstock.com&prdNo=12&blockNo=12&blockType=G12) (4 pages).
Organic Wool Toddler Pillow, All Natural &100% GOTS Certified Pure Organic, Wool 'Pearls' accessed Jul. 13, 2017 (https://www.amazon.com/Organic-Certified-Antibacterial-Hypoallergenic-Toddlers/dp/B00P6SKT7K) (2 pages).
700 Fill Power Temperature Regulating Down Comforter accessed Jul. 13, 2017 (https://www.cuddledown.com/itemdy00.aspx?ID=70,3276&T1=Z1087+100+10+01) (12 pages).
Hobbs WL90 Count Batting Heirloom Wool, 90" x 108" accessed Jul. 13, 2017 (https://www.amazon.com/Hobbs-WL90-Count-Batting-Heirloom/dp/B0063G013G/ref=sr_1_9?e=UTF8&qid=1497374885&sr=8-9&keywords=wool+batting) (1 page).
10" Sewn-Thru Boxstitch PrimaSera Down Alternative duvet insert, Tc 230 accessed Jul. 13, 2017 (http://hotelsuppliesdepot.com/10-Sewn-Thm-Boxstitch-PrimaSera-Down-Alternative-Duvet-INSERTTc-230-j 409. html) (1 page).

Badenia 3649730149 Bettcomfort Steppbett, 4-Jahreszeiten, Micro Thermo, 155 x 220 cm, weiß accessed Jul. 13, 2017 (https://www.amazon.de/Badenia-Bettcomfort-03649730149/\-Jahreszeiten-Steppbett-Thermo/dp/B0026IBFN0/ ef=sr_1_5?=kitchen&ie=UTF8&qid=1460493398&sr=1-5) (1 page).
Office Action and Search Report for China Patent Application No. 201580019495.5 (dated May 3, 2018) (12 pages).
Design Within Reach, Min Bed, http://www.dwr.com/bedroom-beds/min-bed/6348.html? lang=en_US) (accessed May 23, 2018) (19 pages).
Extended European Search Report issued in EP18192998.5, dated Nov. 20, 2018, 8 pages.
International Search Report and Written Opinion for Application No. PCT/US19/28543, dated Aug. 22, 2019, 16 pages.
Notice of Allowance dated Jul. 12, 2019 for U.S. Appl. No. 29/641,393 (pp. 1-10).
The Casper Mattress, casper.com/mattresses/casper/, retrieved Aug. 27, 2019, 29 pages.
The Essential Mattress, casper.com/mattresses/casper-essential/, retrieved Aug. 27, 2019, 15 pages.
The Wave Mattress, casper.com/mattresses/casper-wave/, retrieved Aug. 27, 2019, 30 pages.
Chewy Casper Memory Foam Dog Bed (Aug. 28, 2017).
Groupon Water-Resistant Orthopedic Foam Pet Crate Mats, announced 2018.
Unboxing and Selling Up a Casper Dog Bed, announced Sep. 14, 2016.
The Casper Dog Mattress in-depth Review Demo, announced Feb. 15, 2017.
How to set up your dog mattress, no date available.
EZ Wash Fleece Lounger Poly-Filled Dog Bed, announced 2018.
Luca Crate Cuddler, announced Jul. 15, 2016.
International Search Report and Written Opinion for PCT/US18/46573 dated Oct. 22, 2018, 23 pages.
Office Action dated Mar. 20, 2019 for U.S. Appl. No. 15/611,902 (pp. 1-16).
Japanese Office Action (with English language translation) for Application No. 2017-507687, dated Apr. 2, 2019, 9 pages.
International Search Report and Written Opinion for PCT/US19/12582, dated Apr. 25, 2019, 14 pages.
Canadian Patent Application No. 2,909,804, Office Action dated Oct. 18, 2019, 4 pages.
Office Action dated Apr. 9, 2020, for U.S. Appl. No. 29/610,852 (pp. 1-6).
Office Action dated Dec. 2, 2019 for U.S. Appl. No. 29/610,852 (pp. 1-7).
Office Action dated Mar. 16, 2020, for U.S. Appl. No. 15/677,387 (pp. 1-20).
Office Action dated May 6, 2020 for U.S. Appl. No. 15/872,737 (pp. 1-10).
Office Action dated Nov. 15, 2019 for U.S. Appl. No. 29/610,695 (pp. 1-7).
Office Action dated Nov. 15, 2019 for U.S. Appl. No. 29/610,820 (pp. 1-6).
Office Action dated Nov. 18, 2019 for U.S. Appl. No. 29/610,826 (pp. 1-7).

\* cited by examiner

DOG MATTRESS

REFERENCE TO PRIOR APPLICATION

This application claims the benefit of U.S. Provisional Application Ser. No. 62/375,466 filed on Aug. 16, 2016, which is hereby incorporated by reference in its entirety.

FIELD OF THE DISCLOSURE

The present disclosure is directed to a foam-based dog mattress with improved features related to its construction and cleaning.

BACKGROUND

In the wild, dogs instinctually dig and scratch away their sleep surface before bedding down. The reason is to dig away wet or hot earth in order to create a cool and dry sleep surface. Wild dogs will also seek out protected areas to sleep in order to prevent attacks from predators. These protected areas typically are a wall, a fence, or a bank of trees that provide shelter/protection in at least one direction. As dogs typically live/sleep in packs, having something warm to nestle into is another common behavior.

Domesticated dogs still carry over this behavior. Further, it is becoming more common for domesticated dogs to sleep indoors with their families. Thus it is beneficial for dogs to have a bed of their own that respect dogs' instinctual needs for sleep and comfort. It is also important that a dog bed offer ease of use, durability and care/maintenance to afford simplicity for a typical pet owners modern lifestyle.

The design choices in most prior-art dog beds are primarily cost-driven. The cheapest stuffing or fill material is a loose fiber (typically polyester). This loose fiber filling can shift around and compress very easily. The negative aspect of fiber shifting is often advertised as a way for dogs to prepare the sleep surface as in the wild. But since the material being shifted is also the sleep surface, the dog ends up pushing the soft, insulating material away and sleeping on fabric only.

A large category of dog beds are called "bolster" beds. They provide a raised perimeter for a dog to nestle into. Nearly all bolsters are filled with loose fiber (as noted above). Loose fiber has no structure and cannot hold its shape. The loose fiber may fill the fabric cover to give the appearance of structure. But in actual use, the raised bolsters splay open and compress flat very easily. This ends up providing no real support or protected pocket to nestle into. This also leads to the dog bed flattening out prematurely and looking sloppy within the pet owners home.

Some dog beds use loose fiber and/or foam combinations for construction. Foam is an ideal filler as it provides great support and resiliency. But foam does not look good when stuffed into a fabric cover. It is much firmer than loose fiber and usually cut with flat faces and edges. These flat and firm faces result in a dog bed that looks very rectilinear and square. While foam is good for the dog's comfort, this square look is dissonant with most interior furnishings within the pet owners home. Furthermore, foam pieces are typically very sticky and hard to stuff and un-stuff from the fabric cover. Similarly, loose fiber filled pillows are equally hard to stuff/un-stuff from the fabric cover as they are different sizes/shapes and overstuffed to give the appearance of fullness and structure.

Further, the majority of dog beds are not washable. As dogs are inherently messy creatures, a dog bed can quickly become soiled and dirty. Dogs are also naturally curious. They will seek out things to chew on or tear apart. Making a dog bed with a washable fabric cover is often done by making a zippered cover. Once the dog bed needs cleaning, the pet owner will unzip the fabric cover, remove the inside filling (loose fiber in a pillow case or foam pieces) and wash the cover. But a loose zipper can often be chewed on by a dog or drag on and scratch a pet owner's floor.

Accordingly, there is a need for an indoor mattress for domesticated dogs that provides a soft and supportive sleep surface that is also easy to clean.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
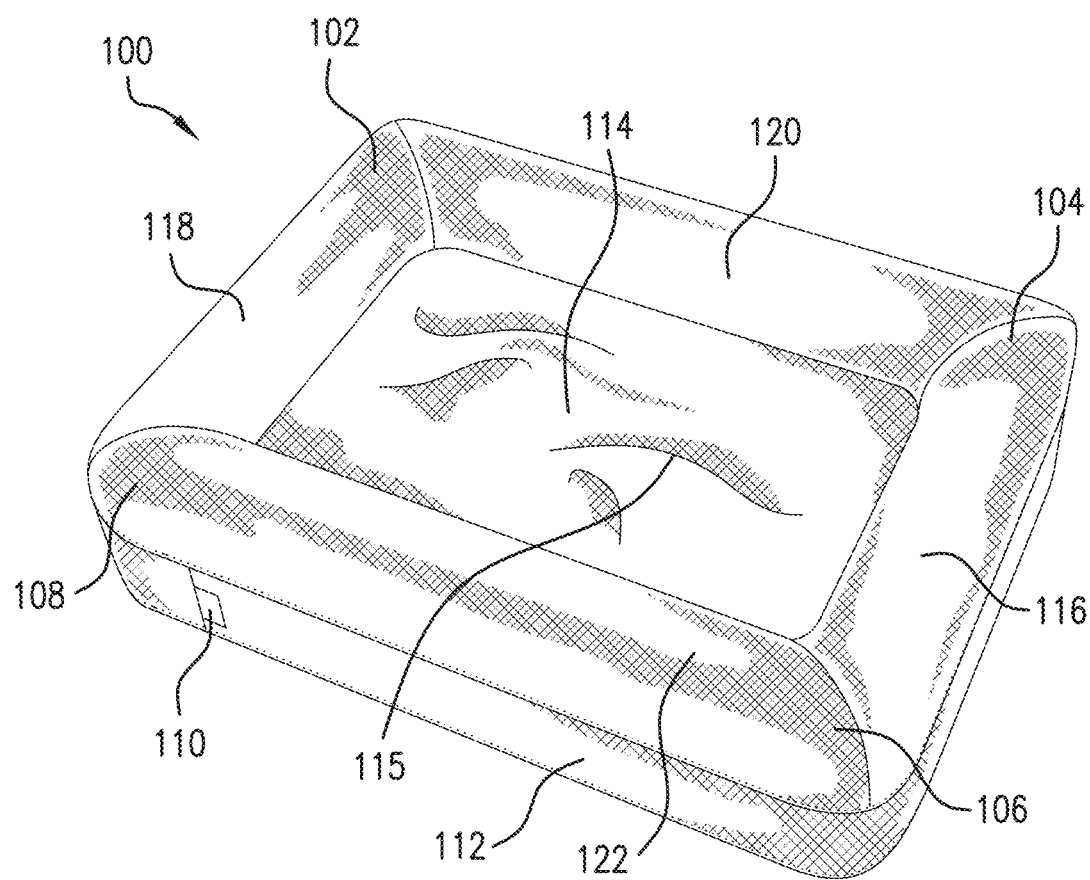
FIG. 1A is an overhead view of the top side of a dog bed, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Overview

The disclosed embodiments provide dogs a protected and comfortable place to bed down by allowing them to prepare their sleep surface as in the natural world. The disclosed embodiments also improve the pet owner experience, including making the assembling, washing, and maintaining of the dog bed as enjoyable, memorable, and easy as possible.

The disclosed embodiments are designed specifically to comport with the nature of dogs and their sleeping habits. Specifically, dogs in the wild like to burrow and find protected places to sleep. This is done for temperature regulation (where wild dogs will dig away wet or hot dirt to access a dry and cool place to sleep) and for protection/refuge (dogs will typically be down next to a wall or large trees to protect themselves from predators while asleep). Dogs sleep in a variety of positions depending in part on the ability of dogs to regulate temperature while sleeping. Dogs are poly-phasic sleepers and average 23 sleep/wake episodes per day.

The disclosed embodiments include an foam-based dog bed (with no loose fiber) comprising 5 components: 4 identical internal bolsters and 1 internal mattress. Both the internal mattress and bolsters may be comprised of 2-layers of different foam qualities. The foam pieces are wrapped in a slippery fabric to make stuffing and un-stuffing into the outer fabric cover very easy. Additional combinations of bolsters and internal mattresses may be used.

The outer fabric cover is comprised of a top fabric, border fabric, and bottom fabric. The top fabric incorporates specifically tailored wrinkles to allow a dog to dig, scratch, and prepare their bed. On the bottom panel of the dog bed is an outer perimeter zipper. The outer zipper starts and stops at a zipper pocket, which also serves as a hinge to open/close the bottom panel. The zipper pocket holds the zipper pull to prevent a dog from biting at it as well as keeping it protected from scratching a pet owner's floor.

The inner zipper panel captures the inner foam mattress. The foam bolsters are captured between the inner and outer/perimeter zipper and fabric panels. Capturing both the mattress and foam bolsters with fabric on all sides provides a significant structure and durability.

The solution may arrive to the customer with the foam pieces compressed and rolled up in a plastic bag. Once the foam bag is opened, it inflates and rises quickly, which is very fun to experience. There may also be a dog toy hidden in every box as a surprise.

Although this description shows a dog bed in a rectangular format, the dog bed may be formed in a square, circular or oval configuration.

II. Features

Turning now to FIG. 1A, shown is an overhead view of the top side of a dog bed 100. The dog bed 100 incorporates four controlled corner radii, a front left controlled corner radius 108, a front right controlled corner radius 106, a rear left controlled corner radius 102 and a rear right controlled corner radius 104. Interspersed among the four controlled corner radii are four straight raised bolster covers: a raised front bolster cover 122, a raised rear bolster cover 120, a raised left bolster cover 118 and a raised right bolster cover 116. Taken together, the raised front bolster cover 122, the front right controlled corner radius 106, the raised right bolster cover 116, the rear right controlled corner radius 104, the raised rear bolster cover 120, the rear left controlled corner radius 102, the raised left bolster cover 118, and the front left controlled corner radius 108 surround an inner sleep surface cover 114.

All of the raised front bolster cover 122, the front right controlled corner radius 106, the raised right bolster cover 116, the rear right controlled corner radius 104, the raised rear bolster cover 120, the rear left controlled corner radius 102, the raised left bolster cover 118, and the front left controlled corner radius 108, and the inner sleep surface cover 114 may comprise a microfiber-based fabric.

Figure 1B:
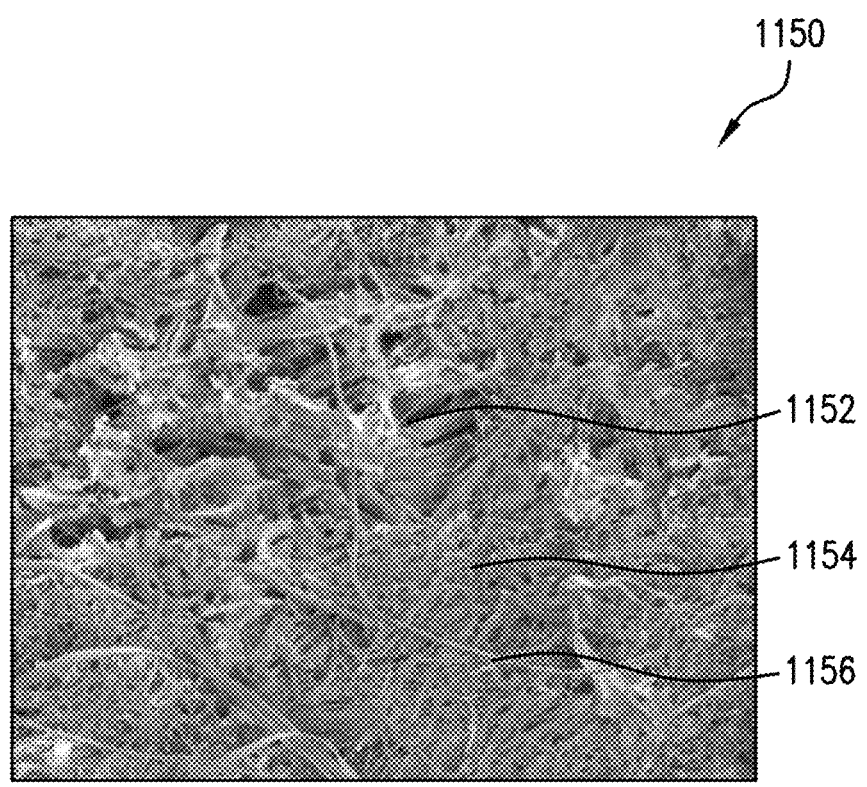
FIG. 1B is a magnification of a microfiber used in the dog bed, in accordance with some embodiments.

Turning for the moment to FIG. 1B, shown is a magnification of a microfiber sample 1150 that may be used in the dog bed 100. The microfiber may comprise bonded microfiber in non-woven construction with fine fibers 1154 and thicker melted fibers 1152. The fibers are curly and flexible. This provides a soft turf/mat appearance with very few fibers sticking up 1156.

Turning back to FIG. 1A, the raised front bolster cover 122, the front right controlled corner radius 106, the raised right bolster cover 116, the rear right controlled corner radius 104, the raised rear bolster cover 120, the rear left controlled corner radius 102, the raised left bolster cover 118, and the front left controlled corner radius 108 are higher than the inner sleep surface cover 114. This provides a safe space for a dog to nestle into when the dog is on top of the inner sleep surface cover 114.

The raised front bolster cover 122, the front right controlled corner radius 106, the raised right bolster cover 116, the rear right controlled corner radius 104, the raised rear bolster cover 120, the rear left controlled corner radius 102, the raised left bolster cover 118, and the front left controlled corner radius 108 may be constructed as a tight perimeter around the other structures of the dog bed 100. This is in contrast with the inner sleep surface cover 114, which is constructed as a loose and soft around the other structures of the dog mattress. Moreover, the inner sleep surface cover 114 includes a wrinkly top 115, which are specifically tailored wrinkles into the top cover so that dogs can scratch, dig, and push material around without impacting the foam-based comfort surface below.

A front outside perimeter 112 is located below the raised front bolster cover 122. The front outside perimeter 112 may comprise a woven border. A label 110 may be sown onto the front outside perimeter 112. The woven border of the front outside perimeter 112 is repeated on the left, right and rear sides of the dog bed 100 (not shown).

Figure 1C:
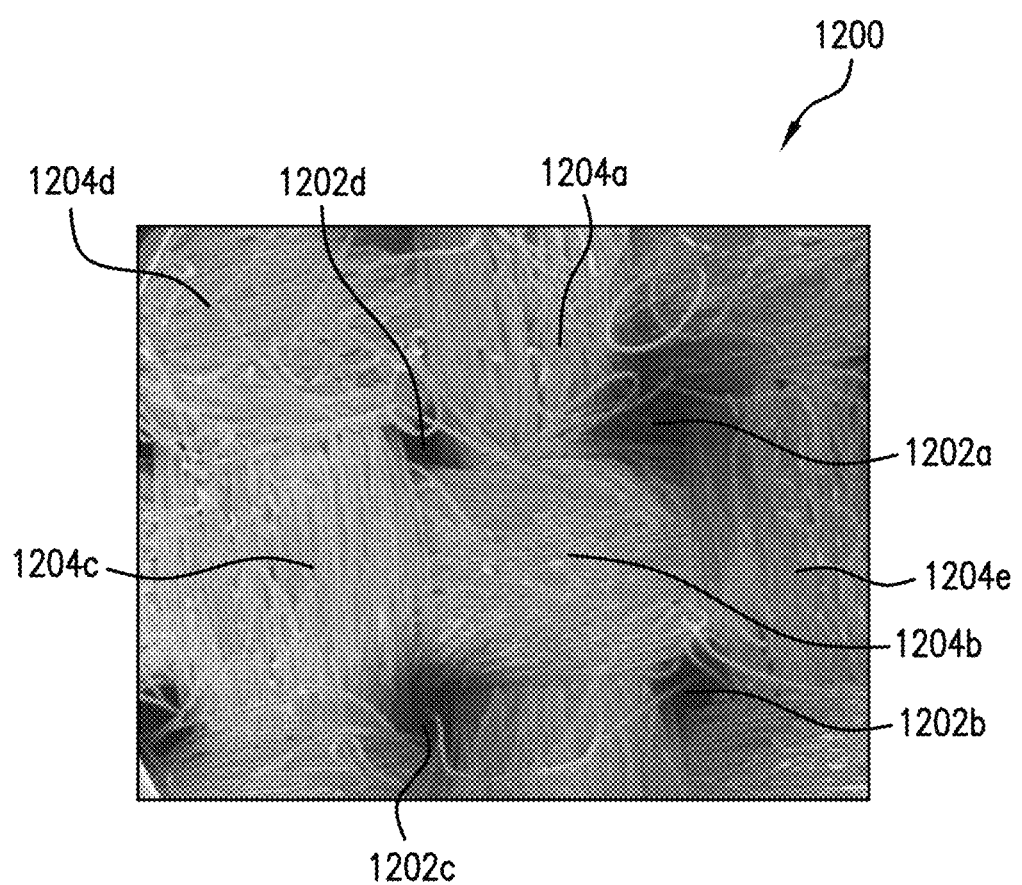
FIG. 1C is a magnification of a woven fabric used in the dog bed, in accordance with some embodiments.

Turning to FIG. 1C, shown is a magnification of a woven border 1200 that may be used in the dog bed 100. The woven fabric consists of yarns that are bundled tight and have a smooth overall surface. Shown are bundled yarns 1204*a*, 1204*b*, 1204*c*, 1204*d*, 1204*e* that are bundled in a tight weave leaving small openings 1202*a*, 1202*b*, 1202*c*, 1202*d*. The small openings 1202*a*, 1202*b*, 1202*c*, 1202*d* are easy places for dog hair to pierce.

Figure 2:
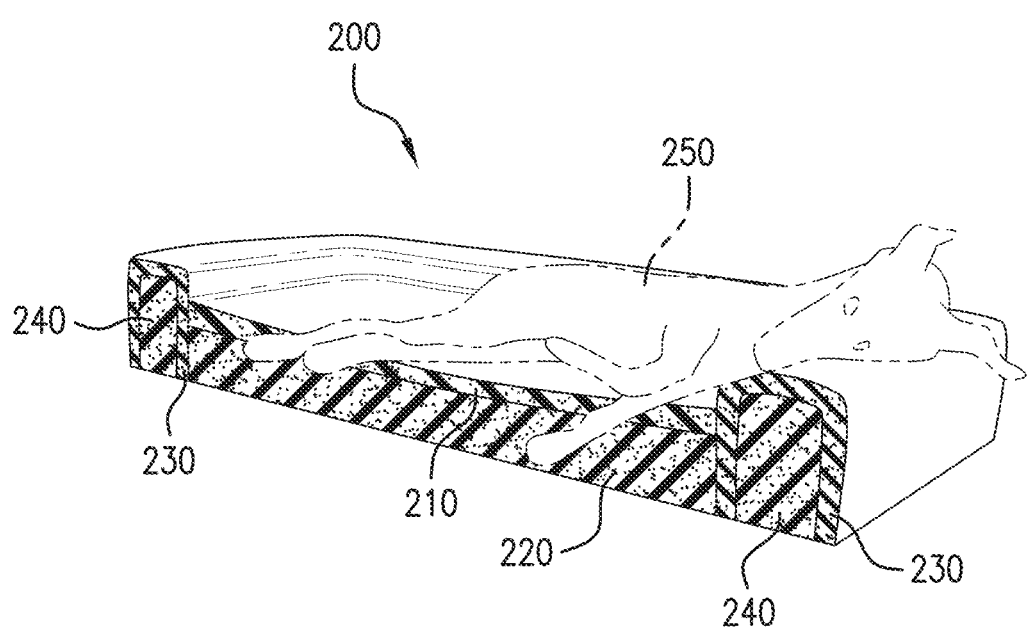
FIG. 2 is a cross-section view of a dog bed, in accordance with some embodiments.

Turning to FIG. 2, shown is cross-section view 200 of the dog mattress foam structure that supports a dog 250. In the center of the cross-section view 200 is: (1) a mattress topper memory foam 210, which is supportive and helpful for a dog's aging joints and bones; and (2) a mattress core polyurethane foam 220, which is a supportive layer that prevents a dog from ever bottoming out on floor. On the sides of the cross-section view 200 is: (1) a bolster topper polyurethane foam 230, which is a soft top provides comfort and helps fill out cover to ensure great, long lasting look; and (2) a bolster core polyurethane foam 240, which is a super firm core that provides support and structure.

The mattress topper memory foam 210 may be viscoelastic polyurethane and have the following physical characteristics:
  Density: 2.0 pounds per cubic foot (pcf), +/−0.1 pcf;
  IFD (Indention Force Deflection): 10 lb., +/−2 lb.;
  Compression Set: <4%;
  Airflow: >2 cfm (cubic feet per minute); and
  Recovery time: 6 s +/−2 s.

The mattress core polyurethane foam 220 may be conventional polyurethane foam and have the following physical characteristics:
  Density: 1.8 pcf, +/−0.1 pcf;
  IFD: 18 lb., +/−2 lb.; and
  Compression Set: <4%.

The physical properties of the bolster topper polyurethane foam 230 may be:
  Density: 1.8 pcf, +/−0.1 pcf;
  IFD: 10 lb., +/−2 lb.; and
  Compression Set: <4%.

Further, as will be discussed below, the bolster are fabricated in a very specific manner to create extra bulge at the ends to help fill out the outer fabric cover better.

4. The physical properties of the bolster core polyurethane foam 240 may be:
  Density: 1.8 pcf, +/−0.1 pcf;
  IFD: 44 lb, +/−3 lb; and
  Compression Set: <4%.

In other embodiments, the mattress may consist of a first horizontal layer selected from the group consisting of latex and latex-like foam, above a second horizontal layer comprising memory foam, all above a third horizontal layer consisting of polyurethane foam.

Figure 3:
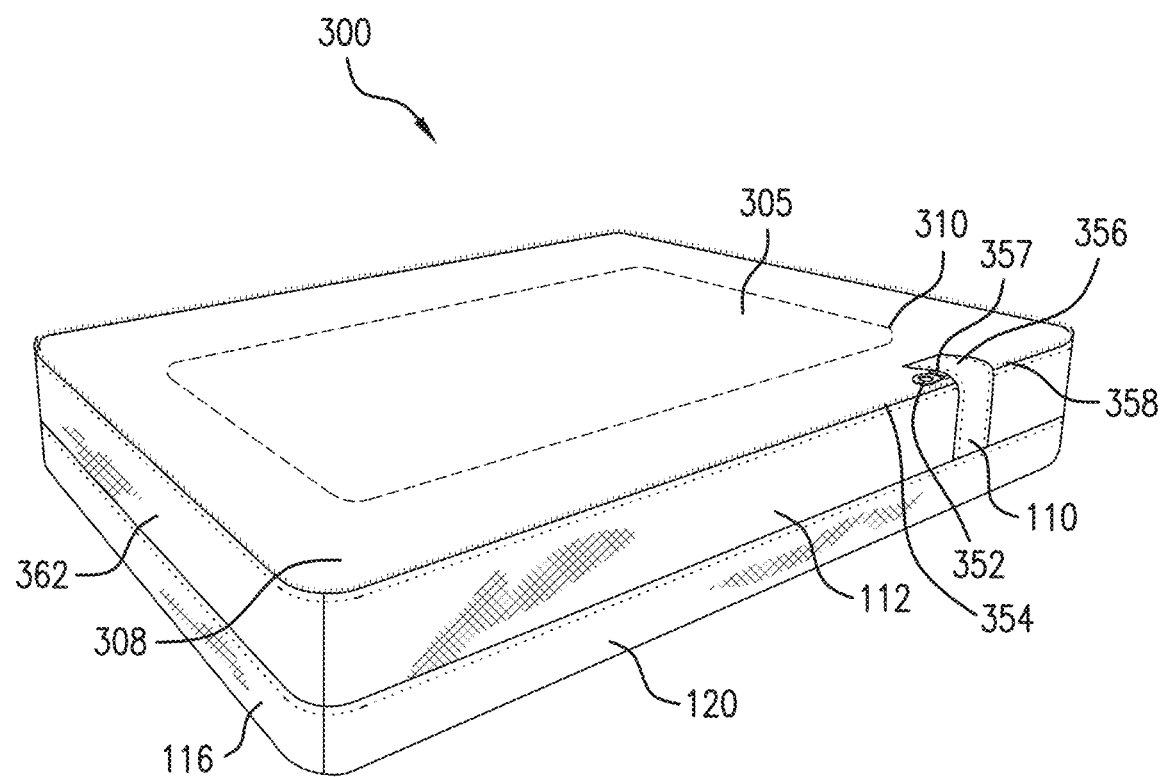
FIG. 3 is an overhead view of the bottom side of a dog bed with the bottom covers fully secured, in accordance with some embodiments.

Turning to FIG. 3, shown is a dog bed bottom view 300. Shown is a label 110, with an inner bottom cover 305, a bottom transition border 310, and a outer bottom cover 308. (The inner bottom cover 305 and the outer bottom cover 308 are made of one piece of fabric; the existence of the bottom transition border 310 is due to the lower inner zipper teeth 402 on the underside of the bottom cover discussed in FIG. 4.) A front outside perimeter 112 and the right outside perimeter 362 are equivalent to the front outside perimeter 112 in FIG. 1A. A raised front bolster cover 120 and a raised right bolster cover 116 are equivalent to the same portions of the dog bed as in FIG. 1A. An outer zipper pull 352 tracks along the starting outer zipper teeth 354 goes around the outer bottom cover 308 of the dog bed and ends at the ending outer zipper teeth 358. When the outer zipper pull 352 is at the starting outer zipper teeth 354, the outer bottom cover 308 and the inner bottom cover 305 are fully secured to the rest of the dog bed. The hinge 356 secures the outer zipper pull 352 in an interior pocket 357 when the outer zipper pull 352 is at the starting outer zipper teeth 354. This allows the outer zipper pull 352 to not stick out and injure the dog (or human) when the dog bed is in use.

The hinge 356 also secures the outer bottom cover 308 and inner bottom cover 305 to the rest of the dog bed even when the outer zipper pull 352 is at the outer zipper teeth 358.

Figure 4:
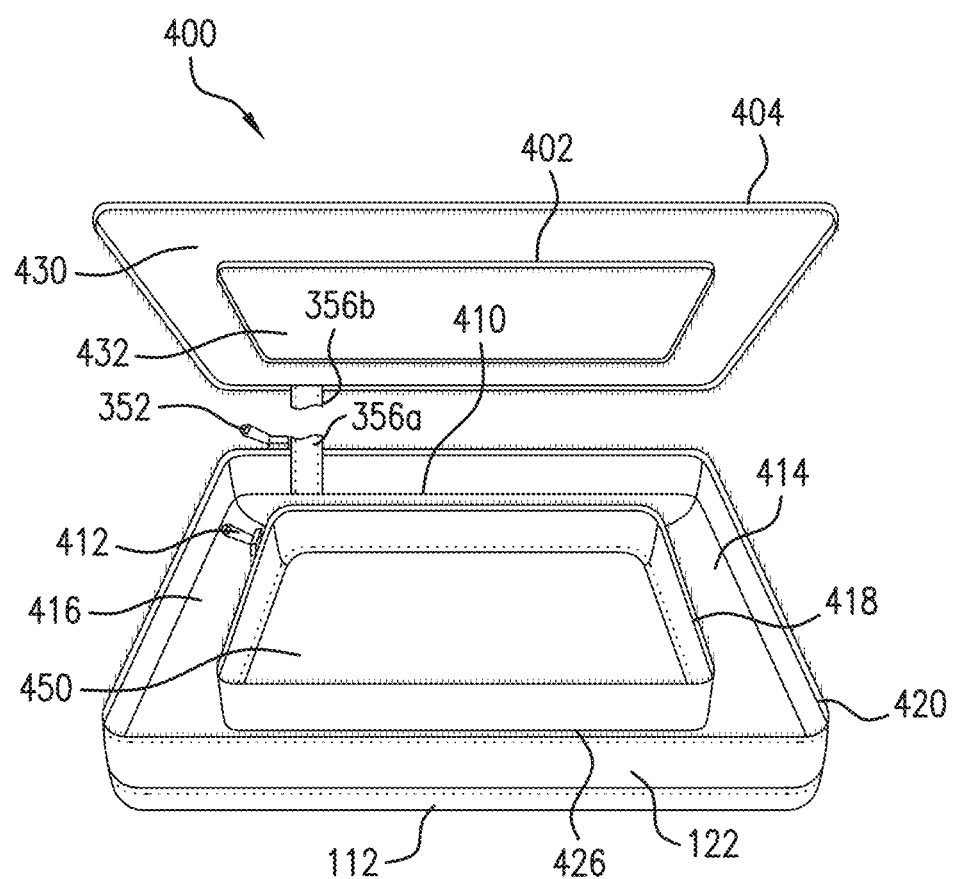
FIG. 4 is an exploded view of the bottom side of a dog bed with the bottom covers fully open and no mattress or bolsters in place, in accordance with some embodiments.

Turning to FIG. 4, shown is an expanded view 400 of the bottom of the dog bed with the outer cover 430 and the inner cover 432 completely removed from the rest of the dog bed. The hinge 356a, 356b (which normally secures the outer cover 430 and the inner cover 432 to the rest of the dog bed at all times) is accordingly broken into two parts.

FIG. 4 also shows four channels for four bolsters: a rear bolster channel 426, a front bolster channel 410, a left bolster channel 416 and a right bolster channel 414. The four channels surround a mattress channel 450 for a mattress.

FIG. 4 also shows the outer zipper pull 352, which is capable of joining lower outer zipper teeth 404 and upper outer zipper teeth 420. The inner zipper pull 412 is capable of joining lower inner zipper teeth 402 and upper inner zipper teeth 418. In contrast to the lower outer zipper teeth 404 and upper outer zipper teeth 420 that entirely surround the outer border of the dog bed, the lower inner zipper teeth 402 and upper inner zipper teeth 418 may only surround approximately three-quarters of the mattress channel 450 and inner cover 432. This ensures that a portion of the inner cover 432 always remains attached to the remainder of the dog bed, as discussed in FIG. 7.

Figure 5:
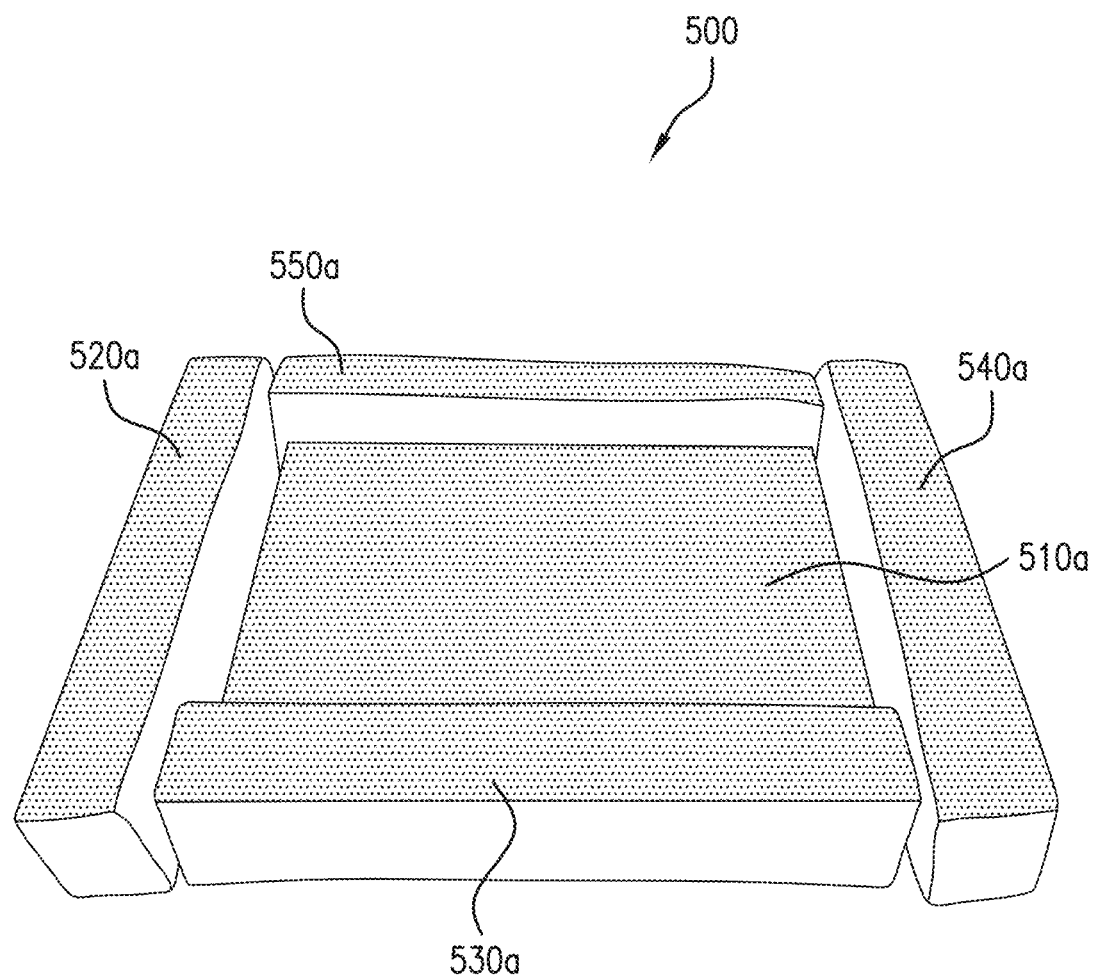
FIG. 5 is an overhead view of the bottom sides of the mattress and bolsters, in accordance with some embodiments.

Turning to FIG. 5, shown is a compilation 500 of the lower side of 4 bolsters and a mattress. Shown is the lower side of mattress 510a, the lower side of left bolster 520a, the lower side of right bolster 540a, the lower side of front bolster 530a and the lower side of rear bolster 550a. Each of the lower sides of these items have straight edges so that it fits properly into the rest of the dog bed when the lower sides are pointed downwards.

Each of the lower sides of these items may have a darker appearance so that the lower side of each item is easily ascertainable. In addition, foam inherently is sticky. Thus the foam bolsters are surrounded by foam sheaths that make stuffing and unstuffing into the outer fabric cover easy.

Figure 6:
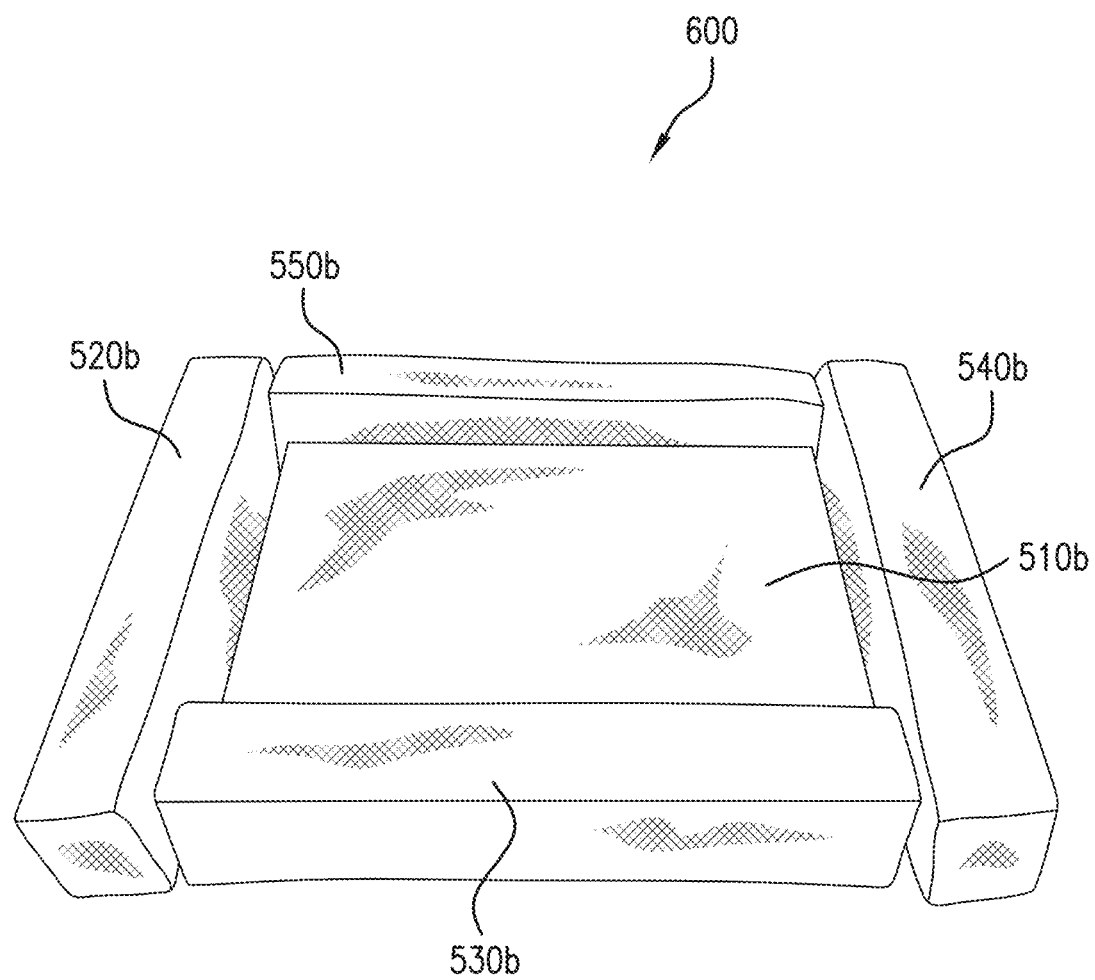
FIG. 6 is overhead view of the top sides of the mattress and bolsters, in accordance with some embodiments.

Turning to FIG. 6, shown is a compilation 600 of the upper side of 4 bolsters and a mattress. Shown is the upper side of mattress 510b, the upper side of left bolster 520b, the upper side of right bolster 540b, the upper side of front bolster 530b and the upper side of rear bolster 550b. Each of the upper sides of the bolsters have rounded edges so that it fits properly into the rest of the dog bed when the upper sides are pointed upwards.

Each of the upper sides of these items may have a lighter appearance so that the upper side of each item is easily ascertainable by the user when installing the bolsters and mattress in their respective channels in the dog bed. This is particularly useful for the mattress, which is shaped the same way on the upper side and the lower side (unlike the bolsters which are shaped differently). Thus, the two-toned color structure ensures that the mattress will be installed within the mattress channel in the proper orientation. This ensures that the mattress topper memory foam 210 is above the mattress core polyurethane foam 220. Any two-tone color structure may be used to accomplish this goal. In the alternative, a two-tier fabric structure may be used to identify the proper installation of the bolsters and mattress.

In addition, the size of each of the four bolsters may be the same so that they may be interchanged one for the other when placed in the dog bed bolster channels. This improves ease of installation of the bolsters into the bolster channels.

Given the dog bed's multiple covers, multiple removable bolsters and removable mattress, there are a number of configurations that the dog bed may take when being assembled. FIGS. 7, 8, 9 and 10 illustrate some of these configurations.

Figure 7:
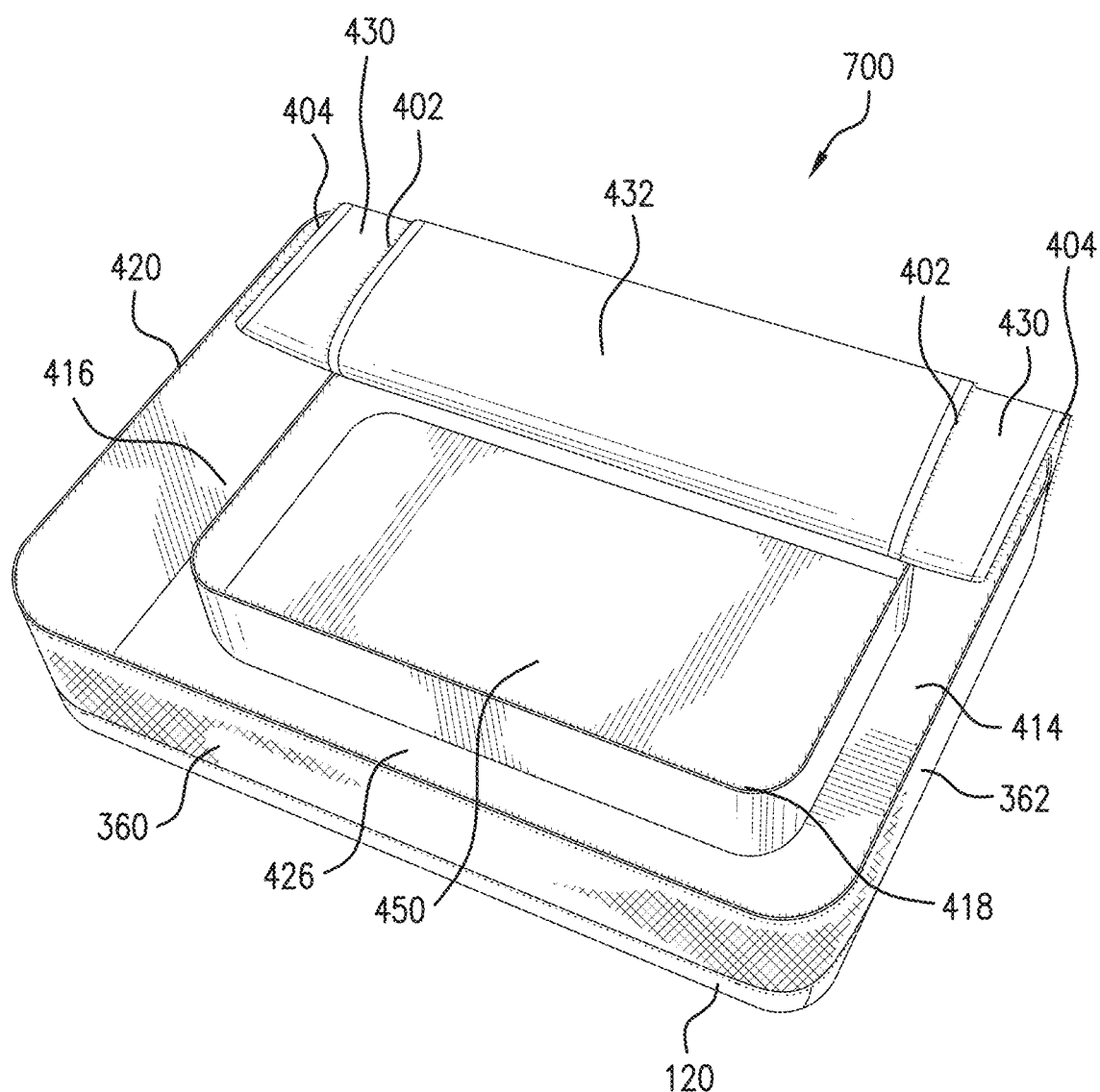
FIG. 7 is an overhead view of the bottom side of the dog bed with the bottom covers fully pulled back and with the mattress and bolsters removed, in accordance with some embodiments.

Turning to FIG. 7, shown is an overhead view 700 of the bottom side of the dog bed with the bottom covers fully pulled back and with the mattress and bolsters removed. Shown is a rear bolster channel 426, a left bolster channel 416, a right bolster channel 414 and a mattress channel 450.

The outer cover 430 is open because the lower outer zipper teeth 404 and upper outer zipper teeth 420 are separated. The inner cover 432 is open because the lower inner zipper teeth 402 and the upper inner zipper teeth 418 are separated. Also shown is the rear outside perimeter 360 and the right outside perimeter 362. Also shown is the raised rear bolster cover 120.

Figure 8:
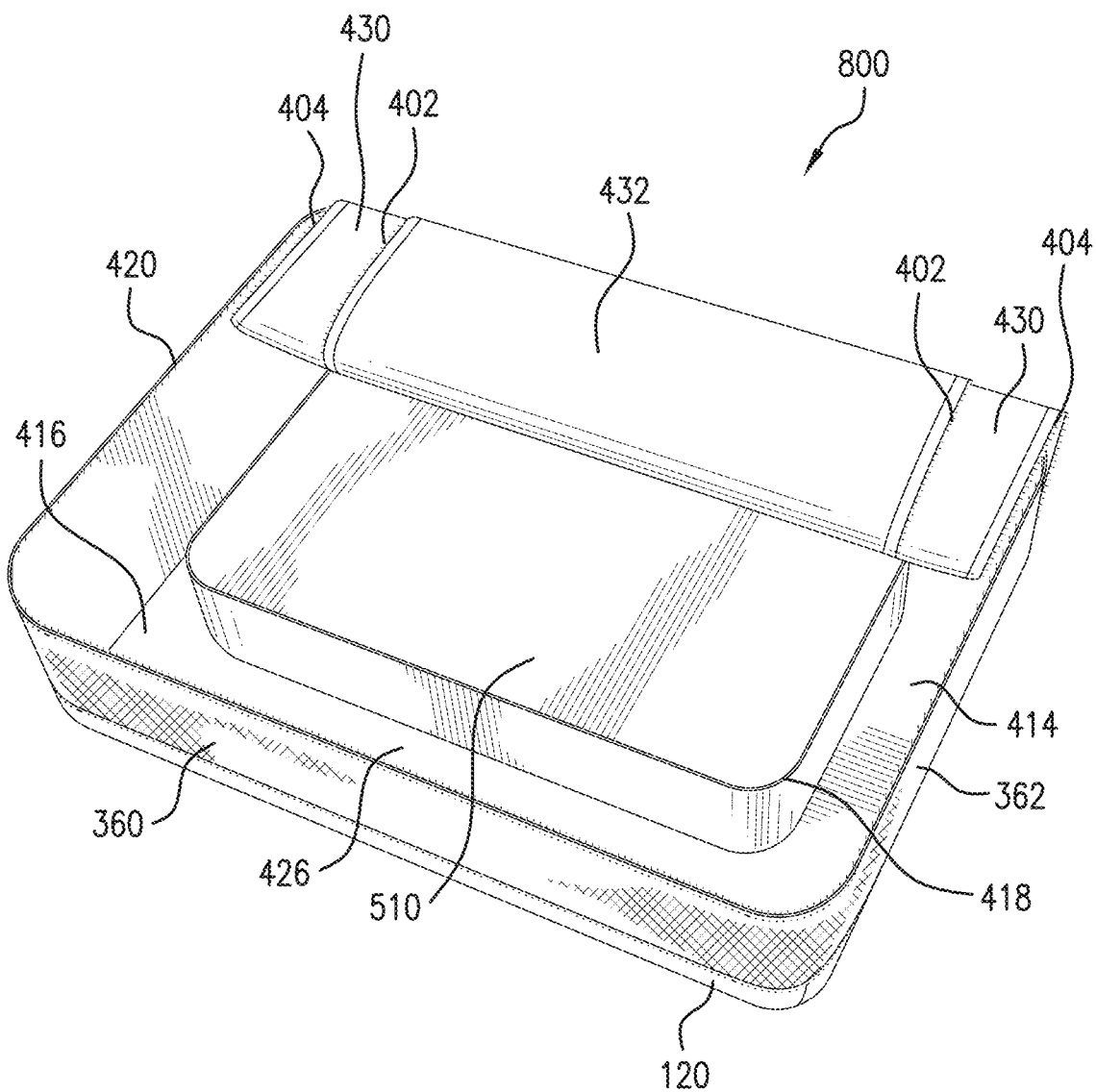
FIG. 8 is an overhead view of the bottom side of the dog bed with the bottom covers fully pulled back, with the bolsters removed and with the mattress in place, in accordance with some embodiments.

Turning to FIG. 8, shown is an overhead view 800 of the bottom side of the dog bed with the bottom covers fully pulled back and with the mattress in place and with the bolsters removed. Shown is a rear bolster channel 426, a left bolster channel 416 and a right bolster channel 414. The mattress 510 is placed in the mattress channel. The outer cover 430 is open because the lower outer zipper teeth 404 and upper outer zipper teeth 420 are separated. The inner cover 432 is open because the lower inner zipper teeth 402 and the upper inner zipper teeth 418 are separated. Also shown is the rear outside perimeter 360 and the right outside perimeter 362. Also shown is the raised rear bolster cover 120.

Figure 9:
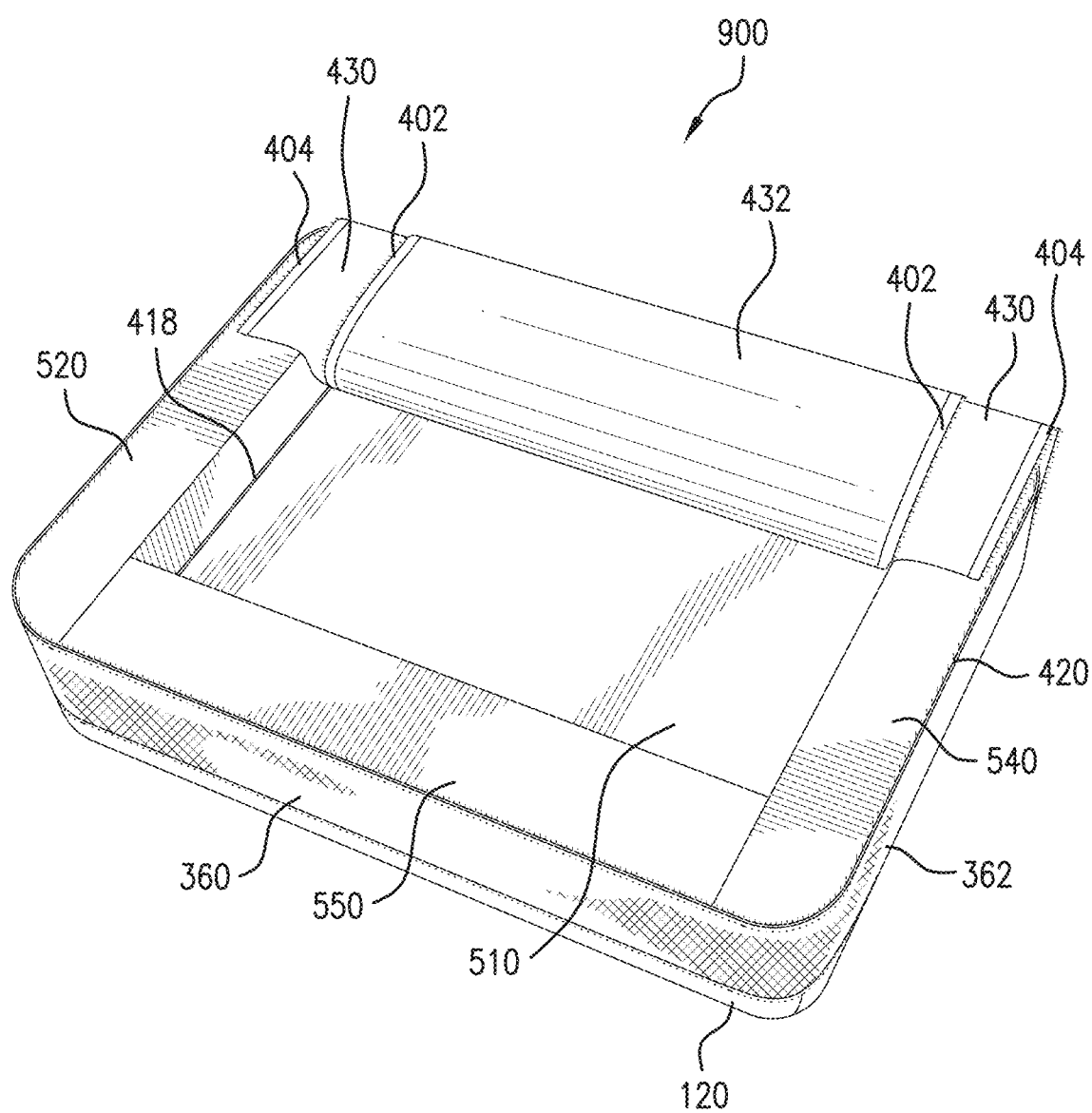
FIG. 9 is an overhead view of the bottom side of the dog bed with the bottom covers fully pulled back and with the bolsters and the mattress in place, in accordance with some embodiments.

Turning to FIG. 9, shown is an overhead view 900 of the bottom side of the dog bed with the bottom covers fully pulled back and with the mattress in place and with the bolsters in place. Shown is a rear bolster 550 in its rear bolster channel, a left bolster 520 in its left bolster channel and a right bolster 540 in its right bolster channel. The mattress 510 is placed in the mattress channel. The outer cover 430 is open because the lower outer zipper teeth 404 and upper outer zipper teeth 420 are separated. The inner cover 432 is open because the lower inner zipper teeth 402 and the upper inner zipper teeth 418 are separated. Also shown is the rear outside perimeter 360 and the right outside perimeter 362. Also shown is the raised rear bolster cover 120.

Figure 10:
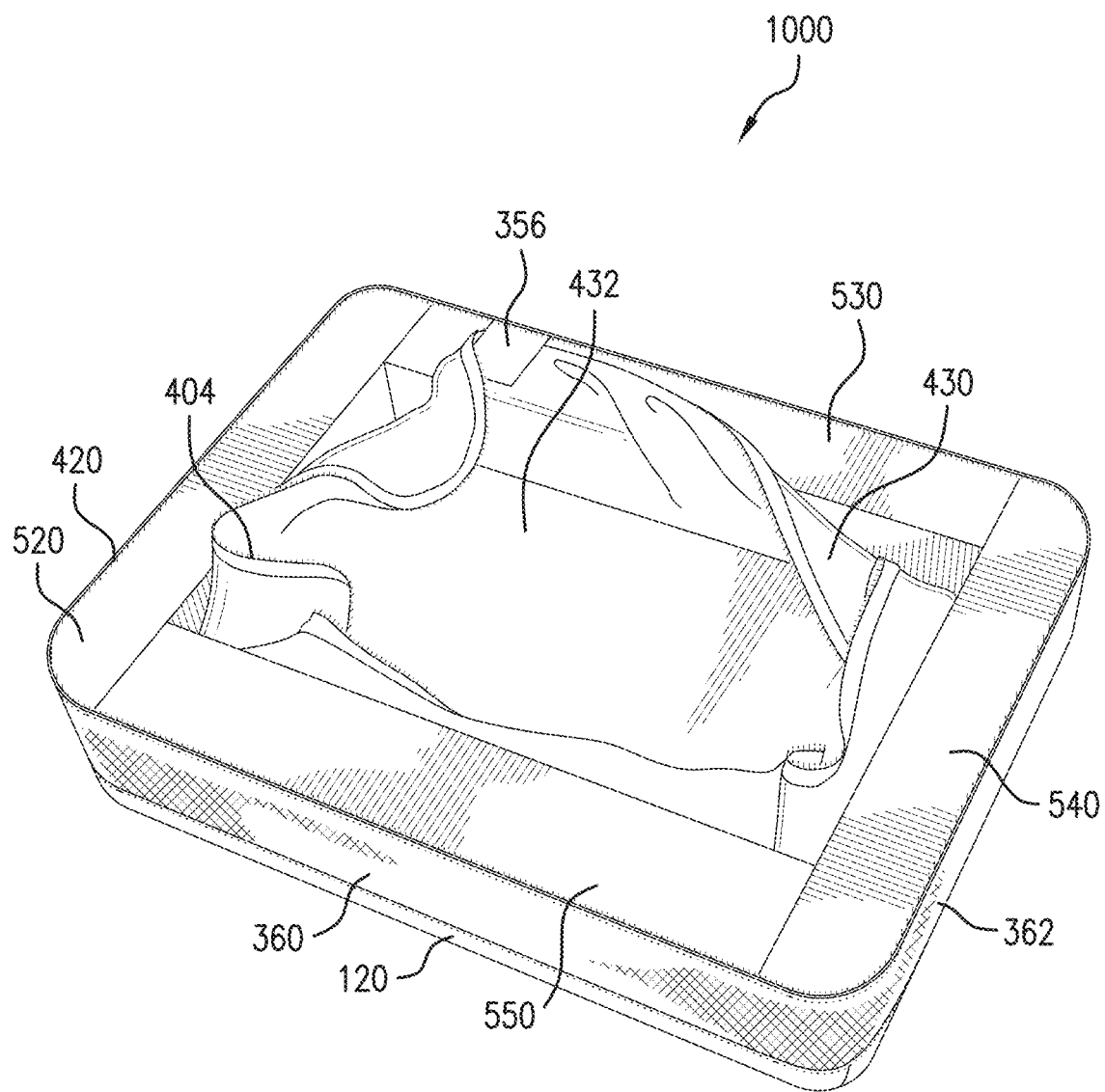
FIG. 10 is an overhead view of the bottom side of the dog bed with the inner bottom cover zippered close, with the bottom outer cover zippered open and with the bolsters and the mattress in place, in accordance with some embodiments.

Turning to FIG. 10, shown is an overhead view 1000 of the bottom side of the dog bed with the inner bottom cover zippered close, with the bottom outer cover zippered open and with the bolsters and the mattress in place, in accordance with some embodiments. Shown is a rear bolster 550 in its rear bolster channel, a left bolster 520 in its left bolster channel, a right bolster 540 in its right bolster channel and a front bolster 530 in its front bolster channel. The inner cover 432 covers the mattress that is placed in the mattress channel. The outer cover 430 is open because the lower outer zipper teeth 404 and upper outer zipper teeth 420 are separated. The outer cover 430 is held in place to the rest of the dog bed by hinge 356. Also shown is the rear outside perimeter 360 and the right outside perimeter 362. Also shown is the raised rear bolster cover 120.

Figure 11:
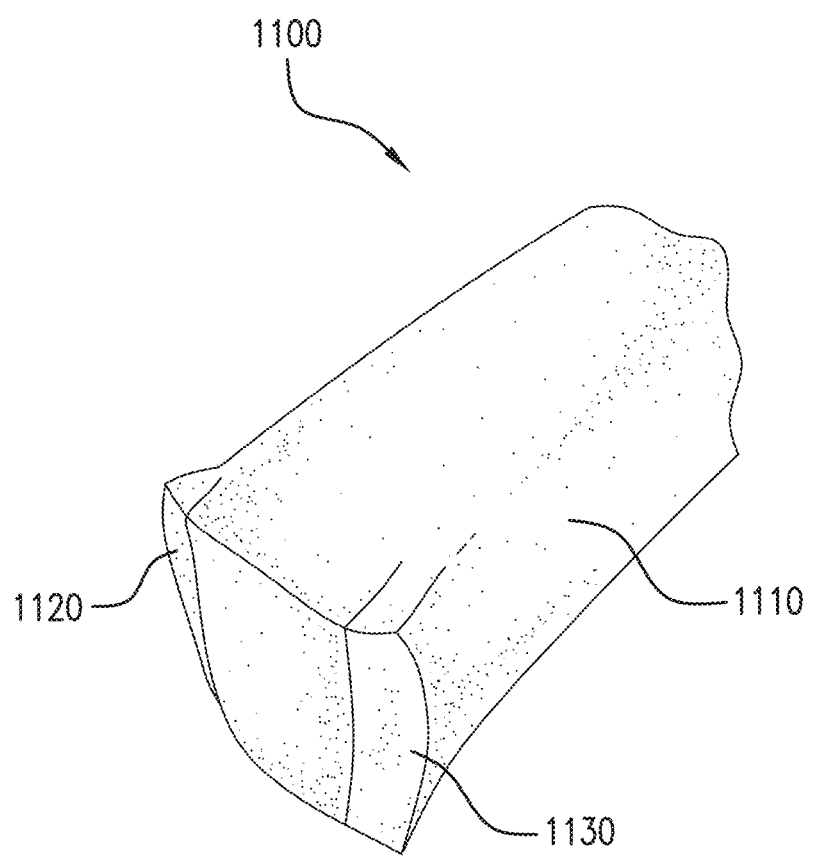
FIG. 11 is an overhead view of foam portion of a bolster, in accordance with some embodiments.

The bolsters 520, 530, 540, 550 are composed of a foam shaft surrounded by a sheath. FIG. 11 shows an overhead view of foam portion of a bolster without the bolster sheath. (The other side of the foam portion is similarly constructed.) Shown is a bolster shaft 1110 with a bolster left edge 1120 and bolster right edge 1130. The bolster left edge 1120 and bolster right edge 1130 have flared ends so that the sheathed bolster shaft 1110 may be more easily installed in their respective bolster channels 410, 412, 414, 426. Further the bolster left edge 1120 and bolster right edge 1130 create an extra bulge at the bolster ends to help fill out the outer fabric cover better.

The construction of the dog bed described above provides the following beneficial properties:

The inner and outer double zipper design create a very unique construction that boxes in foam pieces and maintains structure and durability. This helps the bolster from splaying open and looking worn out.

Using foam in the bolster versus loose fiber provides support for dog's heads and bodies. Foam also prevents flattening out and splaying open.

Using 2 different qualities of foam (firm core and soft wrap) in the bolster creates both structure and a soft look. This helps provide structure while still giving an aesthetic sensitive to the pet owner's home décor.

III. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus comprising:
 a dog bed comprising:
 a lower portion having an inside lower portion and an outside lower portion;
 an upper portion having an inside upper portion and an outside upper portion;
 a hinge connecting the outside upper portion and the outside lower portion;
 wherein the outside upper portion comprises a sleep surface cover, a front raised bolster cover, a left raised bolster cover, a rear raised bolster cover and a right raised bolster cover;
 wherein the front raised bolster cover, the left raised bolster cover, the rear raised bolster cover and the right raised bolster cover surround the sleep surface cover and are higher than the sleep surface cover;
 wherein the inside upper portion comprises a mattress channel, a front bolster channel, a left bolster channel, a rear bolster channel and a right bolster channel;
 wherein the sleep surface cover constitutes the top of the mattress channel;
 wherein the front raised bolster cover constitutes the top of the front bolster channel;
 wherein the left raised bolster cover constitutes the top of the left bolster channel;
 wherein the rear raised bolster cover constitutes the top of the rear bolster channel;
 wherein the right raised bolster cover constitutes the top of the right bolster channel;
 wherein the inside lower portion comprises an outer cover and an inner cover, wherein the inner cover is capable of covering the mattress channel and wherein the outer cover is capable of covering the bottom of the front bolster channel, the bottom of the left bolster channel, the bottom of the rear bolster channel and the bottom of the right bolster channel;
 wherein the outer cover and the inner cover constitute one piece of fabric;
 upper outer zipper teeth installed around the outer perimeter of the bottom of the front bolster channel, the outer perimeter of the bottom of the left bolster channel, the outer perimeter of the bottom of the rear bolster channel and the outer perimeter of the bottom of the right bolster channel;
 lower outer zipper teeth installed around the outer perimeter of the outer cover;
 upper inner zipper teeth installed around the outer perimeter of the bottom the mattress channel;
 lower inner zipper teeth installed around the outer perimeter of the inner cover;
 an outer zipper pull connecting the upper outer zipper teeth and the lower outer zipper teeth; and
 an inner zipper pull connecting the upper inner zipper teeth and the lower inner zipper teeth.

2. The apparatus as in claim 1, wherein the upper inner zipper teeth are installed around approximately three-quarters of the outer perimeter of the bottom the mattress channel;
 and wherein the lower inner zipper teeth are installed around approximately three-quarters of the outer perimeter of the inner cover.

3. The apparatus as in claim 2, wherein the hinge further comprises a pocket for storage of the outer zipper pull.

4. The apparatus as in claim 1, wherein the front raised bolster cover, the left raised bolster cover, the rear raised bolster cover, the right raised bolster cover and the sleep surface cover comprise a microfiber-based fabric.

5. The apparatus as in claim 4, wherein the sleep surface cover includes a plurality of wrinkles.

6. The apparatus as in claim 1, further comprising:
 a front outside perimeter located below the front raised bolster cover;
 a left outside perimeter located below the left raised bolster cover;
 a rear outside perimeter located below the rear raised bolster cover;
 a right outside perimeter located below the right raised bolster cover;
 wherein the front outside perimeter, the left outside perimeter, the rear outside perimeter and the right outside perimeter comprise a woven fabric.

7. An apparatus comprising:
 a dog bed comprising:
 a lower portion having an inside lower portion and an outside lower portion;
 an upper portion having an inside upper portion and an outside upper portion;
 a hinge connecting the outside upper portion and the outside lower portion;
 wherein the outside upper portion comprises a sleep surface cover, a front raised bolster cover, a left raised bolster cover, a rear raised bolster cover and a right raised bolster cover;
 wherein the front raised bolster cover, the left raised bolster cover, the rear raised bolster cover and the right raised bolster cover surround the sleep surface cover and are higher than the sleep surface cover;
 wherein the inside upper portion comprises a mattress channel, a front bolster channel, a left bolster channel, a rear bolster channel and a right bolster channel;
 wherein the sleep surface cover constitutes the top of the mattress channel;
 wherein the front raised bolster cover constitutes the top of the front bolster channel;
 wherein the left raised bolster cover constitutes the top of the left bolster channel;
 wherein the rear raised bolster cover constitutes the top of the rear bolster channel;
 wherein the right raised bolster cover constitutes the top of the right bolster channel;
 wherein the inside lower portion comprises an outer cover and an inner cover, wherein the inner cover is capable of covering the mattress channel and wherein the outer cover is capable of covering the bottom of the front bolster channel, the bottom of the left bolster channel, the bottom of the rear bolster channel and the bottom of the right bolster channel;
 wherein the outer cover and the inner cover constitute one piece of fabric;
 a mattress located within the mattress channel;
 a front bolster located within the front bolster channel;
 a left bolster located within the left bolster channel;
 a rear bolster located within the rear bolster channel;
 a right bolster located within the right bolster channel;
 upper outer zipper teeth installed around the outer perimeter of the bottom of the front bolster channel, the outer perimeter of the bottom of the left bolster channel, the outer perimeter of the bottom of the rear bolster channel and the outer perimeter of the bottom of the right bolster channel;
 lower outer zipper teeth installed around the outer perimeter of the outer cover;

upper inner zipper teeth installed around the outer perimeter of the bottom the mattress channel;

lower inner zipper teeth installed around the outer perimeter of the inner cover;

an outer zipper pull connecting the upper outer zipper teeth and the lower outer zipper teeth;

an inner zipper pull connecting the upper inner zipper teeth and the lower inner zipper teeth.

8. The apparatus as in claim 7, wherein the front bolster, the left bolster, the rear bolster and the right bolster are approximately the same size.

9. The apparatus as in claim 7, wherein each of the front bolster, the left bolster, the rear bolster and the right bolster comprises a bolster topper polyurethane foam and a bolster core polyurethane foam;

wherein the indention force deflection of the bolster topper polyurethane foam is less than the indention force deflection of the bolster core polyurethane foam.

10. The apparatus as in claim 9, wherein each of the front bolster, the left bolster, the rear bolster and the right bolster have flared ends.

11. The apparatus as in claim 10, wherein each of the front bolster, the left bolster, the rear bolster and the right bolster have a two-toned color structure.

12. The apparatus as in claim 7, wherein the mattress comprises a mattress topper memory foam and a mattress core polyurethane foam.

13. The apparatus as in claim 12, wherein the mattress topper memory foam comprises a visco-elastic polyurethane.

14. The apparatus as in claim 7, wherein the upper inner zipper teeth are installed around approximately three-quarters of the outer perimeter of the bottom the mattress channel;

and wherein the lower inner zipper teeth are installed around approximately three-quarters of the outer perimeter of the inner cover.

15. The apparatus as in claim 7, wherein the hinge further comprises a pocket for storage of the outer zipper pull.

16. The apparatus as in claim 7, wherein the front raised bolster cover, the left raised bolster cover, the rear raised bolster cover, the right bolster channel and the sleep surface cover comprise a microfiber-based fabric.

17. The apparatus as in claim 16, wherein the sleep surface cover includes a plurality of wrinkles.

18. The apparatus as in claim 7, further comprising:

a front outside perimeter located below the front raised bolster cover;

a left outside perimeter located below the left raised bolster cover;

a rear outside perimeter located below the rear raised bolster cover;

a right outside perimeter located below the right raised bolster cover;

wherein the front outside perimeter, the left outside perimeter, the rear outside perimeter and the right outside perimeter comprise a woven fabric.

* * * * *